Jan. 25, 1955  C. F. KRUCKER  2,700,563
QUICKLY DETACHABLE DRIVING CONNECTION
Filed May 23, 1950
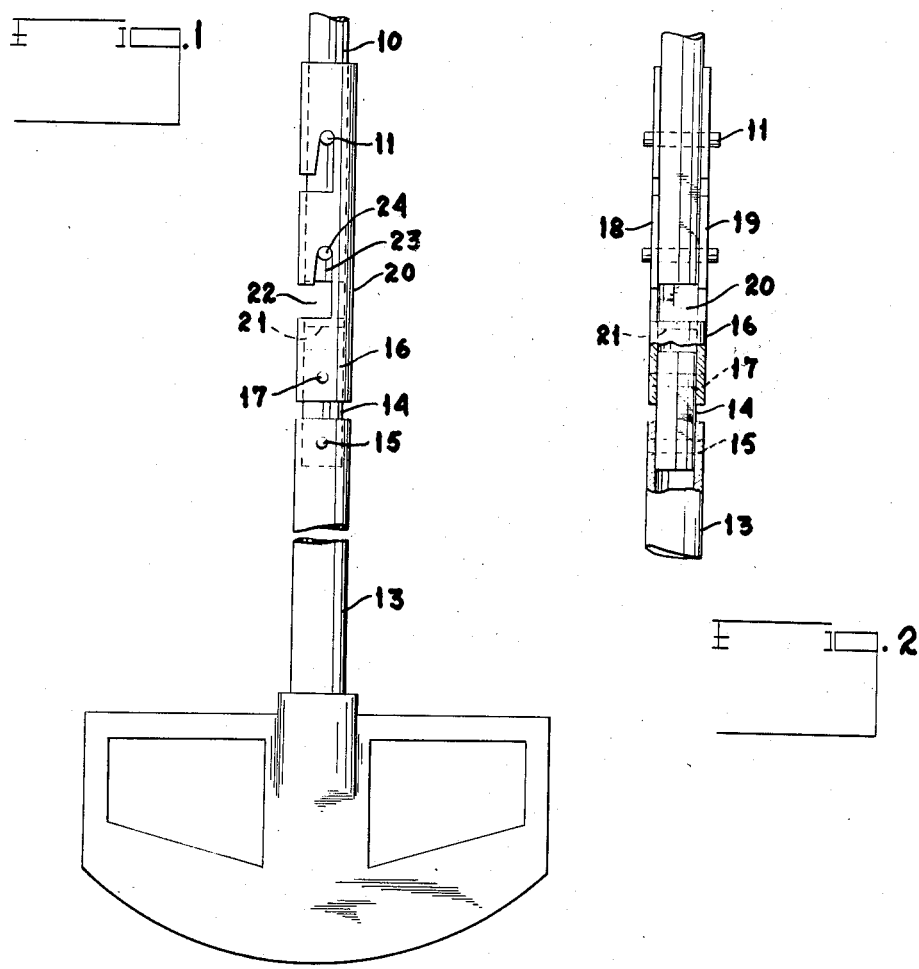
INVENTOR.
Charles F. Krucker
BY
His Attorney

United States Patent Office 2,700,563
Patented Jan. 25, 1955

2,700,563

QUICKLY DETACHABLE DRIVING CONNECTION

Charles F. Krucker, Darlington, Wis.

Application May 23, 1950, Serial No. 163,751

4 Claims. (Cl. 287—2)

The present invention relates to a quickly detachable driving connection, and is concerned primarily with such a connection which is particularly adapted for use in cheese stirring apparatus.

This application is a continuation in part of the co-pending application of Charles F. Krucker, Serial Number 131,145, filed December 5, 1949, and entitled Cheese Stirrer, Patent No. 2,630,303.

During recent times there has come into use a type of apparatus for stirring cheese which consists essentially of an overhead structure that is supported from the ceiling of a room or building and which includes a plurality of electric motors. Positioned beneath these electric motors are a plurality of kettles which receive the material which ultimately is processed into the cheese. A paddle is associated with each kettle and this paddle is driven from an electric motor thereabove.

An important object of the present invention is to provide, in apparatus of the character described, a shaft which is driven from one of the electric motors together with a shaft that is permanently secured to one of the paddles, and a quickly detachable driving connection between the two shafts.

More in detail, the invention has as an object the provision of an arrangement in which a vertical stub shaft is driven from one of the electric motors through appropriate reduction gearing. This stub shaft carries certain elements of a quickly detachable driving connection. Upstanding from one of the paddles is a shaft, the upper free end of which is provided with complemental elements of the detachable connection. Thus, the paddle may quickly be connected to the motor-driven shaft in driving relation with respect thereto or quickly detached therefrom.

Still another object of the invention is to provide, in apparatus of the character indicated, a detachable driving connection between a motor-driven shaft and a paddle shaft and which connection is of the bayonet joint type. Two pairs of pins are arranged in spaced relation on the motor-driven shaft. A sleeve that is open at one side is connected to the upper end of the paddle shaft and is formed with bayonet slots which are adapted to receive said pins to establish a quickly detachable driving connection between the motor-driven shaft and the paddle shaft.

Various other more detailed objects and advantages of the invention such as arise in connection with carrying out the above noted ideas in a practical embodiment will, in part become apparent, and in part be hereinafter stated as the description of the invention proceeds.

The invention therefore comprises a quickly detachable connection of the bayonet joint type which is particularly adapted for use in cheese stirring apparatus.

For a full and more complete understanding of the invention, reference may be had to the following description and accompanying drawing wherein:

Figure 1 is a detailed view mostly in elevation but with parts broken away and shown in section of one of the paddles, the shaft upstanding therefrom, and the elements of the quickly detachable connection between the shaft and the motor-driven shaft, and Figure 2 is a view, mostly in elevation, but with parts broken away and shown in section, taken normal to the showing of Figure 1.

Referring now to the drawing wherein like reference characters denote corresponding parts, and first more particularly to Figure 1, a motor-driven shaft 10 is shown as carrying two pairs of pins 11 with the pins of each pair extending outwardly from the shaft 10 in diametrically opposite directions and with the two pairs spaced apart. Secured to the upper end of a paddle shaft 13 is a coupling member 14 that is a piece of stainless steel tubing. The lower end of this coupling member 14 is received in a socket in the upper end of the paddle shaft 13 and a pin 15 passed through aligned openings in the coupling and shaft respectively. This pin is welded in position.

The upper end of the coupling 14 is received in the lower end of a sleeve 16 and another cross pin 17 is passed through aligned openings in the coupling and sleeve respectively. This cross pin is also welded in position.

Above this lower end section of the sleeve 16 which receives the coupling 14 the sleeve 16 is of a split or open U construction providing side walls 18 and 19 that are joined by a curve or bend 20. The side walls 18 and 19 are formed with two pairs of bayonet slots having a spacing corresponding to the spacing of the two pairs of pins 11 on the shaft 10. Immediately above the upper end of the coupling 14 the sleeve 16 is closed by a cross wall 21 that is located substantially at the bottom of the lowermost bayonet slot.

Each of these bayonet slots includes a horizontal entrance leg 22 which communicates with a vertical leg 23. Each pin 11 is adapted to pass through the entrance leg 22 into the leg 23 and thence upwardly in the latter to become nested into the curved end thereof which is represented at 24.

During actual making and breaking of the connection it is the sleeve 16 which is moved rather than the shaft 10 and pins carried thereby, and the action of the pins above described is merely relative to the sleeve 16.

Under normal conditions, gravity action on the sleeve 16 will maintain the pins 11 seated in the curved upper ends 24 of the vertical legs 23 of the bayonet slots. When occasion arises that it becomes necessary to break this driving connection all that is required is to raise the sleeve 16 upwardly until the pins 11 align with the horizontal legs 22. This sleeve may then be withdrawn from the motor-driven shaft 10.

Conversely when the connection is to be established this sleeve is applied by moving the horizontal entrance legs 22 over the pins 11 until the latter align with the vertical legs 23. The sleeve is then permitted to fall downwardly under gravity action to complete the driving connection.

The use of the stainless steel coupling 14 and the cross pins 15 and 17 in joining the paddle shaft 13 to the sleeve 16 is particularly indicated because of the sanitary regulations which ordinarily obtain in cheese factories. This connection is highly sanitary and eliminates the possibility of cheese or ingredients thereof collecting in crevices. Moreover, it may be easily cleaned.

While a preferred specific embodiment of the invention is hereinbefore set forth, it is to be clearly understood that the invention is not to be limited to the exact constructions, mechanisms, and devices illustrated and described because various modifications of these details may be provided in putting the invention into practice within the purview of the appended claims.

What is claimed is:

1. A quick-detachable coupling and driving connection for vertically related driving and driven shafts, of which the driving shaft is disposed above the driven shaft and the latter is supported from the driving shaft solely through said connection, comprising pins extending outwardly from opposite sides of the driving shaft adjacent its lower end, a sleeve fixedly carried by and extending upwardly of the upper end of the driven shaft, said sleeve having a full-circular lower portion for receiving the upper end portion of the driven shaft, the upper portion of the sleeve receiving and being detachably coupled to the lower end of the driving shaft and having a side opening extending to its upper edge of width to permit passage of the driving shaft into its interior space, whereby the sleeve may be axially related on the driving shaft by shifting it laterally thereover, the sleeve in its side wall portions defining said side opening being provided with bayonet slots having substantially horizontally disposed entrance portions opening to said side opening and substantially vertically disposed portions which open downwardly to the inner ends of said entrance portions, the construction and arrangement being such that said shafts may be detachably connected by disposing the driven shaft and its sleeve to the side of the driving shaft and in position such that side opening of the sleeve faces said driving shaft and that said pins are horizontally aligned with the entrance portions of the bayonet slots, thereupon shifting said driven shaft laterally and in direction as to cause said pins to enter and move to the inner ends of said entrance portions, and finally releasing said driven shaft and thereby permitting it to lower by gravity and said pins to move into and seat against the upper ends of the vertical portions of said bayonet slots.

2. A quick-detachable coupling and driving connection for vertically related driving and driven shafts as set forth in claim 1, wherein the upper end portion of the sleeve has U-section and the side walls of the U define the side opening.

3. A quick-detachable coupling and driving connection for vertically related driving and driven shafts as set forth in claim 1, wherein the driving shaft pins are arranged in vertically spaced pairs and the bayonet slots provided in the sleeve are arranged in pairs which are vertically spaced to correspond to the spacing between the pair of pins.

4. A quick-detachable coupling and driving connection for vertically related driving and driven shafts as set forth in claim 1, wherein the sleeve is provided with an internal cross-wall disposed substantially at the level of the lowermost edges of the bayonet slots for closing off the interior space of said circular lower portion from the interior space of said upper portion of the sleeve.

References Cited in the file of this patent

UNITED STATES PATENTS

| | | |
|---|---|---|
| 60,699 | Cumming | Jan. 1, 1867 |
| 656,456 | Hirsch | Aug. 21, 1900 |
| 691,759 | George | Jan. 28, 1902 |
| 792,366 | Taylor | June 13, 1904 |
| 883,499 | Smith | Mar. 31, 1908 |
| 931,327 | Manzel | Aug. 17, 1909 |
| 1,114,896 | MacRae | Oct. 27, 1914 |
| 1,420,670 | Schuette | June 27, 1922 |
| 1,604,496 | Stevens | Oct. 26, 1926 |
| 1,778,217 | Johnson | Oct. 14, 1930 |
| 1,951,754 | Gilbert | Mar. 20, 1934 |
| 2,328,988 | Martin | Sept. 7, 1943 |
| 2,419,788 | Nickell | Apr. 29, 1947 |
| 2,487,311 | Chapin | Nov. 8, 1949 |